Dec. 5, 1950 W. AUER 2,532,877
MOUNTING FOR READING GLASSES OR THE LIKE
Filed May 15, 1948
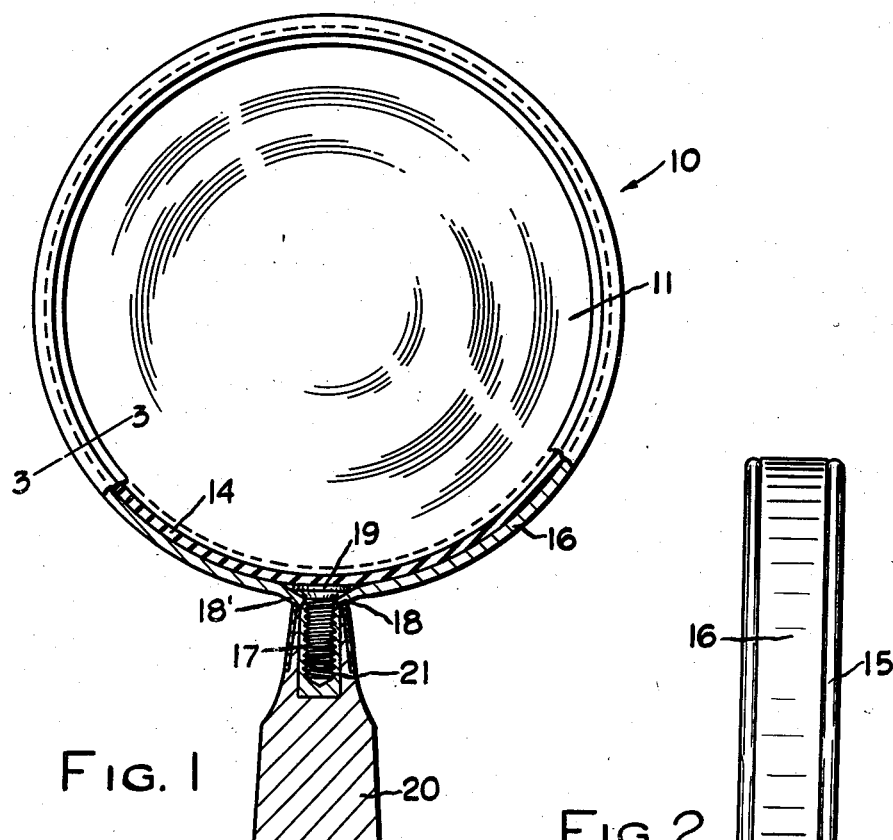
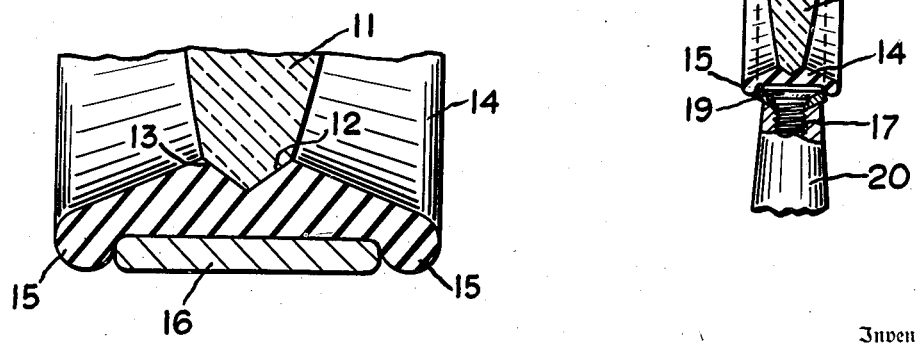
Inventor
WILHELM AUER
By
Attorney Patented Dec. 5, 1950

2,532,877

UNITED STATES PATENT OFFICE 2,532,877

MOUNTING FOR READING GLASSES OR THE LIKE

Wilhelm Auer, Irondequoit, N. Y., assignor to Bausch & Lomb Optical Company, Rochester, N. Y., a corporation of New York Application May 15, 1948, Serial No. 27,228

5 Claims. (Cl. 88—39)

This invention relates to magnifying glasses such as reading glasses or the like and more particularly it has reference to the structure of the mounting which holds the lens.

One of the objects of my invention is to provide an improved reading glass or the like embodying a lens mount which is efficient in operation and relatively simple in structure. A further object is to provide a reading glass or the like having lens mounting means in which the lens is resiliently supported so as to reduce the liability to breakage. A still further object is to provide a reading glass or the like embodying parts which may be readily assembled so that the manufacture of the device is greatly facilitated. Other objects and advantages reside in certain novel features of construction, arrangement, and combination of parts as will hereinafter be more fully described and pointed out in the appended claims.

Referring to the drawings:

Fig. 1 is a front view of a reading glass embodying my invention, certain parts being shown in section.

Fig. 2 is a side view of the reading glass with parts shown in section.

Fig. 3 is an enlarged sectional view taken on line 3—3 of Fig. 1.

A preferred embodiment of my invention is disclosed in the drawings wherein 10 indicates, generally, a reading glass having the magnifying lens 11. The edge of the lens, beveled as at 12, is seated in the groove 13 formed on the inner surface of the annular band 14 which is preferably made of a non-metallic resilient material such as rubber or the like. The resilient band 14 has the two raised peripheral edges 15 on its outer surface. A substantially cylindrical metallic member 16 is mounted around the outer surface of the resilient band 14 with the member 16 snugly engaging the band 14 and positioned between the raised peripheral edges 15 as clearly shown in Fig. 3. A screw 17 projects freely through an opening 18 formed in the metallic member 16 and has its head engaging the outer surface of the resilient band 14. The member 16 is formed outwardly, as shown at 18', around the aperture 18 so as to provide a seat for the screw head 19. A handle 20, having a threaded bushing 21, is threaded onto the projecting screw.

In assembling the device, the screw is first inserted in the aperture 18, the lens is placed within the resilient member 14 and the cylindrical metallic member 16 is then forced down over a raised edge 15 until the metallic member 16 is firmly positioned between the raised edges 15 as shown in Fig. 3. The handle 20 is then threaded onto the projecting end of the screw 17. Since the screw head 19 frictionally engages the resilient band 14, the screw is prevented from turning when the handle is screwed into position.

From the foregoing it will be apparent that I am able to attain the objects of my invention and provide a reading glass or the like having improved mounting means. Since the lens is resiliently mounted, the possibility of breakage of the lens is greatly reduced. The parts may be readily assembled to provide a rigid, efficient structure which is an improvement over the prior art devices since the latter usually embody split rings and projecting lugs for attaching the handles. Various modifications may obviously be made without departing from the spirit of my invention as pointed out in the appended claims.

I claim:

1. In an article of the type described having a lens, the combination of an annular band of resilient material having on its inner surface a groove in which the lens is seated, raised peripheral supporting edges on the outer surface of the band and an endless metallic member encircling the band and positioned between the raised peripheral edges, said edges projecting beyond the outer surface of the member, and a handle secured to the member.

2. A magnifying glass comprising an annular band formed of a non-metallic resilient material, the outer surface of said band having raised peripheral edges, the inner surface of the band having a groove, a lens having its edge seated in the groove, an endless metallic member encircling the band with the member positioned between the raised edges of the band, said member having an aperture, a screw extending outwardly through said aperture and a handle threaded onto the extending part of the screw.

3. A magnifying glass according to claim 2 wherein the head of the screw engages the outer surface of the band so that the screw is held against rotation.

4. A reading glass or the like comprising a lens, a band of non-metallic resilient material encircling the edge of the lens, an endless metallic member encircling the band and in snug engagement therewith, said member having an aperture, a headed screw projecting outwardly through the aperture with the head of the screw positioned between the band and the member, and a handle threadedly secured to the projecting end of the screw.

5. A magnifying glass or the like comprising a lens, a band formed of a relatively yieldable material and extending around and in engagement with the edge of the lens, an endless member formed of a relatively non-stretchable material and extending around and in snug engagement with the outer surface of the yieldable band, said member having an aperture, a headed fastening element projecting outwardly through the aperture with the head of the element positioned between the yieldable band and the member, and a handle secured to the projecting end of the element.

WILHELM AUER.

REFERENCES CITED

The following references are of record in the file of this patent:

UNITED STATES PATENTS

| Number | Name | Date |
|---|---|---|
| 103,807 | Williams et al. | May 31, 1870 |
| 1,206,135 | Otte | Nov. 28, 1916 |
| 1,722,591 | Poeton | July 30, 1929 |
| 1,723,308 | Sipe | Sept. 16, 1929 |
| 1,781,865 | Aniol | Nov. 18, 1930 |
| 1,940,875 | Neuwirth | Dec. 26, 1933 |
| 2,208,642 | Neuwirth | July 23, 1940 |

FOREIGN PATENTS

| Number | Country | Date |
|---|---|---|
| 221,536 | Great Britain | Sept. 10, 1924 |